Dec. 31, 1940.   R. T. McGOLDRICK   2,226,571
VIBRATION NEUTRALIZER
Filed April 21, 1939   4 Sheets-Sheet 3
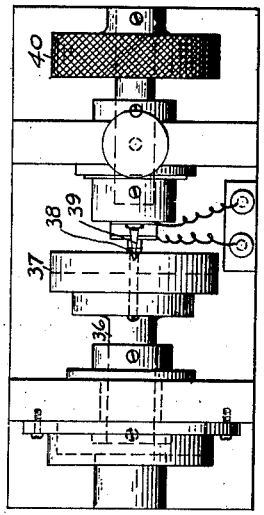
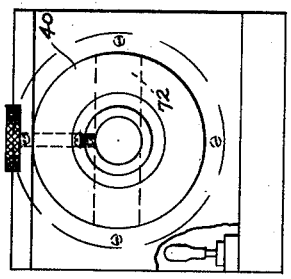
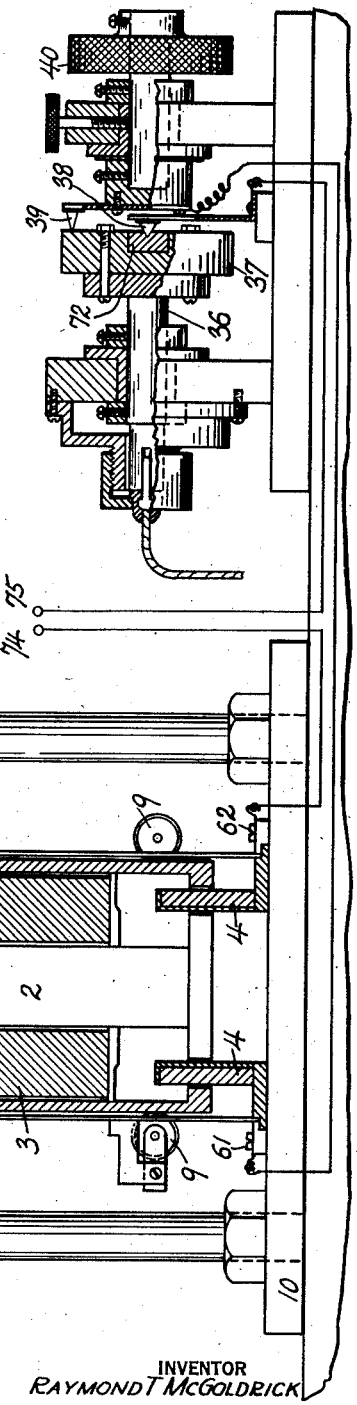
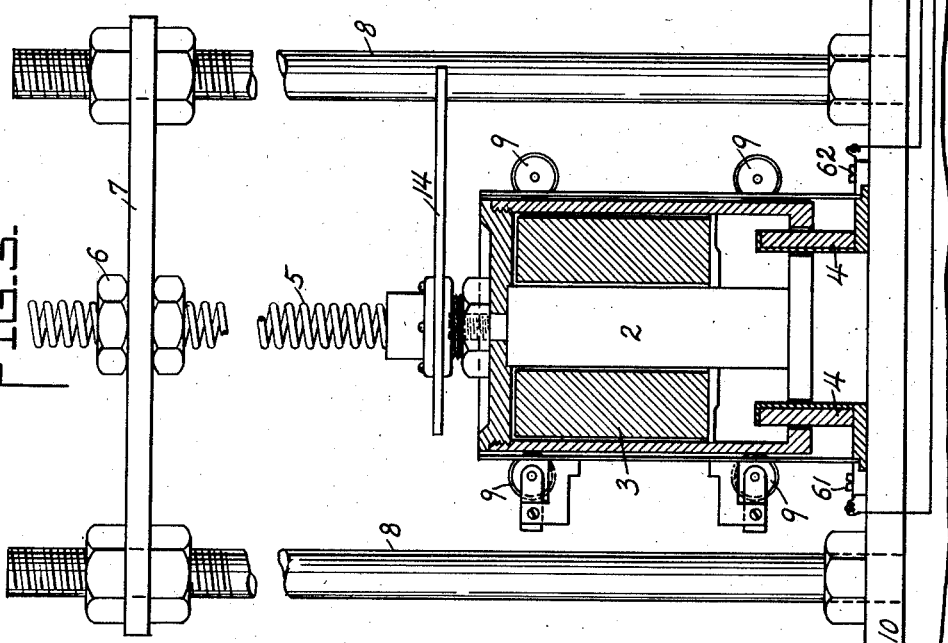
INVENTOR
RAYMOND T McGOLDRICK
BY
ATTORNEY Dec. 31, 1940.  R. T. McGOLDRICK  2,226,571
VIBRATION NEUTRALIZER
Filed April 21, 1939  4 Sheets-Sheet 4
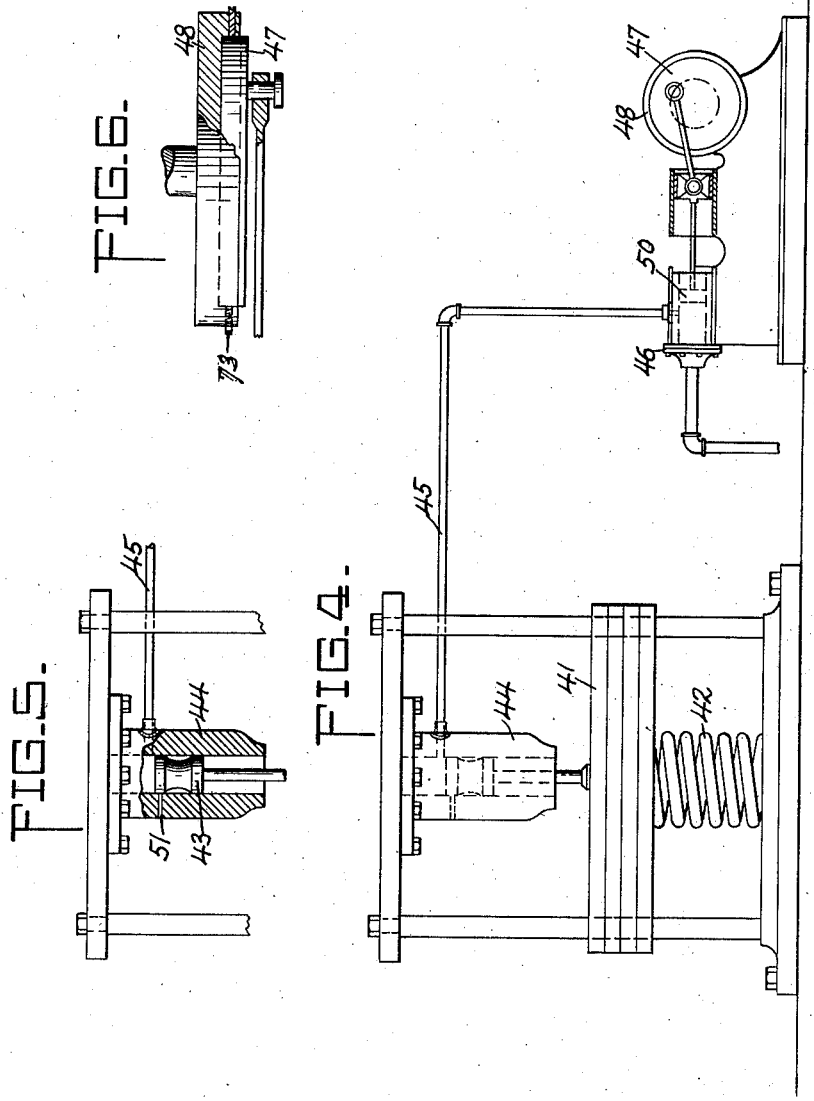
INVENTOR
RAYMOND T. McGOLDRICK
BY
ATTORNEY Patented Dec. 31, 1940

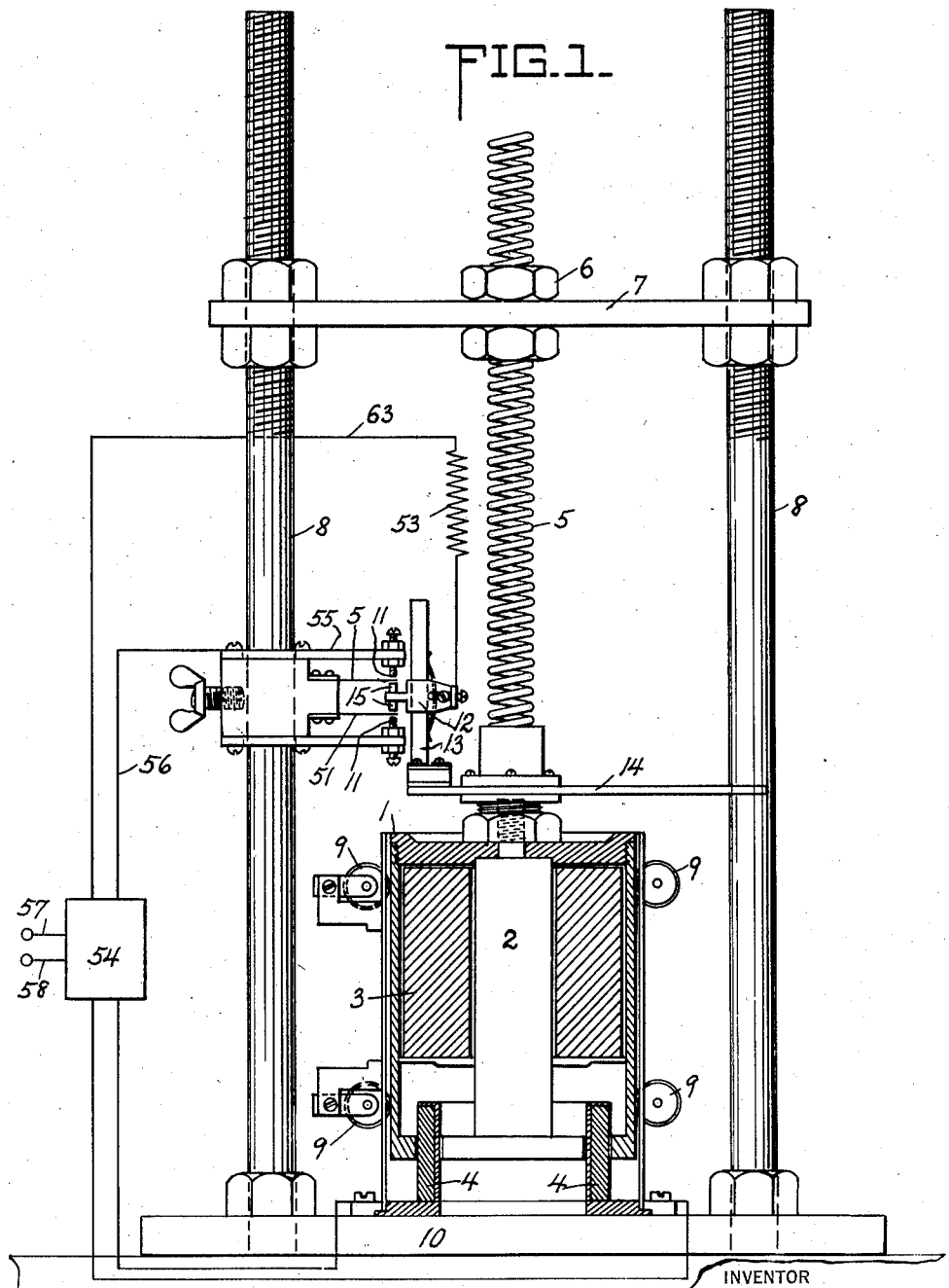

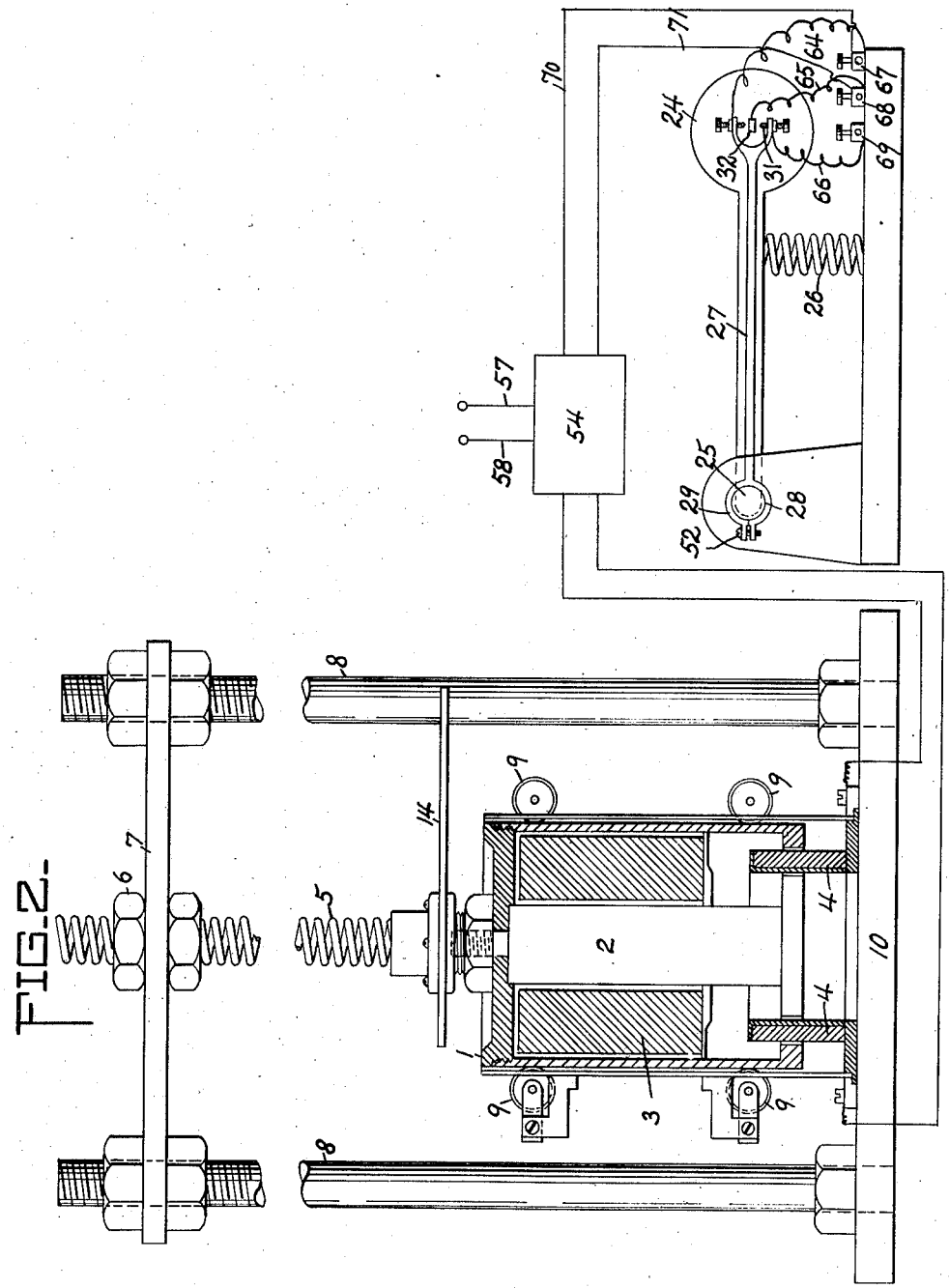

2,226,571

UNITED STATES PATENT OFFICE 2,226,571

VIBRATION NEUTRALIZER

Raymond T. McGoldrick, Washington, D. C.

Application April 21, 1939, Serial No. 269,296

11 Claims. (Cl. 188—1)

(Granted under the act of March 3, 1883, as amended April 30, 1928; 370 O. G. 757)

This invention relates to means for improving the operation of devices generally known as dynamic vibration absorbers or vibration neutralizers. Such devices operate on the principle of resonance whereby, when a relatively small mass or element is attached to a structure by a spring connection, the element will vibrate violently whenever the forces acting on the structure have a frequency equal to the natural frequency of the element. When such resonance exists the element tends to vibrate at such an amplitude and in such phase as to set up forces on the structure equal and opposite to the exciting force thus causing the structure to come to rest. This principle has been known for some time and is embodied in U. S. Patent No. 989,958. As the term "vibration absorber" is used also to designate other forms of anti-vibration devices not employing the resonance principle the devices with which these specifications are concerned will be spoken of hereafter as "vibration neutralizers."

Present forms of vibration neutralizers consist essentially of a combination of mass and spring elements with provision for tuning the system either by varying the mass, or the spring constant, or both simultaneously. Inasmuch as in any practical device the element must be guided, so as to prevent motion in directions other than that desired, friction is necessarily introduced. This reduces the amplitude of the vibrating element and hence its neutralizing action. A distinct improvement in the operation of such devices should thus be obtained by energizing them periodically so as to increase the amplitude. This invention embodies means for accomplishing this result.

A further advantage in energizing the element of the neutralizer is that the mass of the element can thereby be materially reduced. The force reaction on the structure is equal to the product of mass and acceleration of the element and the latter increases directly with the amplitude. Thus if by means of the energizing device the amplitude can be doubled the mass required is reduced to one-half. On large installations, such as for ships, this weight saving is of considerable importance.

The energizing of the element is accomplished by subjecting the element to periodic impulses of the same frequency as that of the disturbing force and in the correct phase to improve the neutralizing action. The impulses may be either electrical or mechanical. Thus a plunger moving in a solenoid may be attached to the element. Pulses of current may be sent through the solenoid, the timing of the pulses being controlled by suitable contacts either on the neutralizer, or on a seismic device attached to the vibrating structure, or on the shaft of the engine causing the disturbance. In some applications it may be necessary to introduce a time delay circuit between the contacts and the solenoid. Where feasible the contacts may be applied directly to the rotating shaft of the apparatus causing the disturbance and the phase adjustment obtained by rotating one contact relative to the shaft. In this case the time delay circuit is unnecessary.

The invention is illustrated in the accompanying drawings, in which:

Fig. 1 is a front elevation, partly in section, of one embodiment of the vibration neutralizer showing one form of timing device.

Fig. 2 is a front elevation of the neutralizer showing a second form of timing device.

Fig. 3 is a front elevation of the neutralizer showing a form of timing device driven by the engine which is the cause of the vibrations which are to be neutralized.

Fig. 4 is a front elevation of a modified form of the neutralizer utilizing mechanical impulses and showing means for applying impulses by the use of steam or compressed air.

Fig. 5 is a side elevational view of a fragment of Fig. 4, partly in section.

Fig. 6 is a plan view of a portion of the device of Fig. 4, partly in section.

Fig. 7 is a plan view of the timing device of Fig. 3; and,

Fig. 8 is an end elevation view of the timing device of Fig. 3, looking from the right in Fig. 3.

Fig. 1 shows a form of neutralizer in which the inertia element consists of a metal casing 1 containing an iron core 2 attached thereto. The casing contains an internal winding 3 wound on core 2 capable of setting up a magnetic flux which is cut by the turns of a fixed coil 4 attached to the base of the neutralizer. The magnetic inertia element, composed of casing 1, core 2 and coil 3, is movable as a unit with respect to the base 10 and coil 4 attached thereto, the base being rigidly attached to the vibrating structure. The inertia element is suspended by a coil spring 5 the turns of which are threaded through a special nut 6 which is rotatably mounted in a plate 7 supported on standards 8 which are mounted upon base 10. The inertia element is constrained to move in a vertical direction by several rollers 9 located above base 10. By turning nut 6 the length of spring 5 can be adjusted until the inertia element is in resonance with the force acting on the structure. The vibrations set up in the element by the action of the unbalanced force on the structure will then automatically neutralize a large part of the vibration in the structure. However, by applying a steady current to the coil 3 and a series of correctly timed current pulsations to coil 4 the neutralizing action can be made practically complete. The magnetic flux set up by the passage of the steady current through coil 3 passes downward through core 2 and spreads out horizontally, cutting the fixed coil 4, passing upward through the side walls of casing 1, then back at the top to the core 2. Thus the magnetic circuit around the coil 3 is completely composed of iron, except for the gap in which the fixed coil 4 is placed. The field cutting the coil 4 is steady except during the periodic pulses of current sent therethrough. By this means periodic impulses are given to the inertia element. The timing of the pulses can be controlled either by a contactor on the neutralizer in conjunction with a suitable time delay circuit or by means of a timing device attached to the shaft of the engine, similar to an ignition timing device.

One type of contactor is shown in detail in Fig. 1. Two fixed contacts 11 are secured to one of the standards 8. A slider 12 is mounted on an upright 13 secured to a plate 14 which is attached to and moves with the inertia element. The slider carries double contact 15. Only one of the fixed contacts is a live one, the upper one being so shown in Fig. 1. The selection of the contact to be used will depend upon the time delay required. If the time delay circuit has sufficient range either contact may be used. The friction between the slider and the upright 13 is such that after hitting one of the contact points the slider is held fixed as long as the upright continues its movement in the same direction, but when the inertia element reverses its motion, the slider moves until it strikes the other contact. With close setting of the contact points the phase of contact is independent of the stroke of the neutralizing or inertia element. The flat springs 51 shown between the slider and the fixed contacts are to improve the contact action and are not essential.

It is essential that the amplitude of the motion of the inertia element be increased without disturbing its phase. This can only be accomplished if the impulses occur at mid-stroke. Since contact is made at the reveral of the stroke the impulse must occur a certain time later and this time must be independent of the magnitude of the stoke. Such a delayed impulse may be obtained by including in the circuit containing the contacts 11 and 15 and the coil 4 a conventional time delay circuit of which many suitable types are well known.

In Fig. 1, the slider 12 is shown connected by lead 63 containing resistance 53 to the time delay circuit schematically shown at 54. The upper contact 11 is connected by means of the metallic bar 55 and lead 56 to the time delay circuit 54, which is supplied with power from a power source not shown through leads 57, 58. From the time delay circuit leads 59, 60 connect to binding posts 61, 62 on the base 10, which posts are connected to the opposite ends of coil 4.

In the form of timing device shown in Fig. 2 the contactor is attached to a seismic element located on the vibrating structure. The same time delay circuit may be used as was used for the timing device of Fig. 1. The weight 24 is free to rotate about the axis 25 and is supported by the compression spring 26. The proportions of mass and spring are such as to give the system a natural frequency much lower than the frequency of the vibration required to be neutralized. Under such conditions the weight does not respond to the vibration but remains practically fixed in space. The contact arm 27 is attached to a fixed boss 28 by a split collar 29, the friction of which can be adjusted by the set screw 52. The arm 27 is bifurcated and carries adjustable contacts 30 and 31. The weight 24 carries fixed contact 32. The relative motion between the arm and the seismic element causes contact to be made. After the contact 32 strikes either of the adjustable contacts the contact arm is carried along with the seismic element until reversal of the motion occurs when contact will be shifted to the opposite contact point. With close setting of the points 30 and 31 contact will occur at the reversal of the stroke regardless of the amplitude and regardless of the drift of the mean position of 24, due to the listing of the ship. The terminal 33 and either 34 or 35 are connected to the time delay circuit 54. Leads 65, 65 and 66 connect contacts 30, 32 and 31 respectively to binding posts 67, 68 and 69. As shown in Fig. 2, binding posts 67 and 68 are connected by leads 70 and 71 respectively to the time delay circuit. With the seismic timing device it is not possible to get 100% neutralization of the vibration since the contact action depends on vibration. The amplitude can only be reduced to the minimum value required for satisfactory operation of the contactor.

Another form of timing device illustrated in Figs. 3, 7 and 8 makes use of a rotating contactor attached to the shaft of the engine the unbalance of which is the cause of vibration. This requires no time delay circuit and is the most practical where it can be installed. The shaft 36 rotates at half the engine speed (there being two contacts per revolution) and carries a disc 37 of insulating material in which is inserted a copper segment 72. The circuit through the fixed coil 4 of Fig. 3 is closed through two contact points which impinge against the rotating element, one contact 38 being located at the center and remaining fixed, while the other 39 is located at the periphery and can be shifted by turning the knob 40. By advancing or retarding the contact 39 the phase of the impulse can be adjusted to obtain the desired neutralizing action. If the vibration frequency is a multiple of the shaft speed, as in the case of vibration due to ship propellers, the shaft of the contactor must be geared to the engine shaft accordingly. Binding posts 74, 75 are shown, by means of which contacts 38 and 39 may be placed in circuit with a power source and binding posts 61, 62 of coil 4.

Figs. 4, 5 and 6 show one form of apparatus utilizing mechanical impulses. The neutralizing element 41 and the spring 42 are designed to give a natural frequency equal to the frequency of the exciting force. A piston 43 attached to the neutralizing element moves in the cylinder 44. Periodic impulses are applied to the piston by steam or compressed air from the line 45. The timing of the impulses is controlled by the piston valve 46 which is operated by a crank driven directly from the engine whose unbalance is the cause of vibration. Phase adjustment is obtained by shifting the disc 47 carrying the crank pin relative to the outer disc 48 which has a fixed rotation relative to that of the engine. This is accomplished by loosening the set screw 73, manually shifting the disc 47 and resetting the set screw. The line 49 is connected to a source of high pressure. When the small piston 50 is near the right hand end of its stroke it allows a pulse of air or steam to enter line 45, the phase being adjusted so that the main piston 43 is about at midstroke and travelling downward. Shortly after midstroke the piston 43 uncovers the port 51 and the air or steam escapes to the atmosphere. The capacity of line 45 is such that no appreciable compression takes place on the upward stroke of the main piston. In this case also if the vibration frequency is a multiple of the engine speed, the disc 48 must rotate at the corresponding speed.

The invention described herein may be manufactured and/or used by or for the Government of the United States of America for governmental purposes without the payment of any royalties thereon or therefor.

Having thus set forth and disclosed the nature of this invention, what is claimed is:

1. In a vibration neutralizer having a weighted element resiliently connected to the vibrating structure, means for increasing the amplitude of the movement of said element comprising means actuated by the vibrations of said structure to apply an energy impulse to said element once during each cycle of its movement.

2. In a vibration neutralizer having a weighted element resiliently connected to the vibrating structure, means for generating and applying to said element a series of energy impulses and means actuated by the vibrations of said structure to time the application of said impulses so that each will be applied at such a point in the vibration cycle as to increase the amplitude of the vibrations of said element without changing their phase relative to the vibrations of said structure.

3. In a means for neutralizing the vibrations of a structure, which means includes an element resiliently mounted on said structure, said element having its mass so selected as to cause it to vibrate in resonance with the vibrations of said structure; means for increasing the amplitude of the vibrations of said element without changing their phase relative to those of the structure, which comprises means for applying to said element a series of energy impulses in the direction of its movement, and means actuated by the vibrations of said structure to time the application of said impulses so that they always occur at the same part of the stroke of said element.

4. Means for neutralizing vibrations in a body, comprising, a weighted element resiliently mounted with respect to said body, means for creating a magnetic flux through said element, a coil fixed with respect to said body and so positioned that its turns will cut the magnetic field about said element, and means for sending pulses of current through said coil in such timed relation to the vibrations of said body as to increase the amplitude of movement of said element without changing the phase of said movement with respect to said vibrations.

5. Means for neutralizing vibrations in a body, comprising, a hollow element resiliently mounted with respect to said body, a core of magnetic material in said element, a winding in said element setting up a magnetic flux in said core, a coil fixed with respect to said body and so located with respect to said core that its turns will cut the magnetic field about said core, and means for sending pulses of current through said coil in such timed relation to the vibrations of said body as to increase the amplitude of movement of said element without changing its phase with respect to said vibrations.

6. Means for neutralizing vibrations in a body, comprising, a weighted element resiliently mounted with respect to said body, means creating a magnetic field about a portion of said element, a coil fixed with respect to said body and so located that its turns cut said magnetic field, a normally open electrical circuit containing a source of power and said coil, means operable to close said circuit upon the completion of a stroke of the movement of said element, and adjustable means contained in said circuit to delay the passage of current through said coil for a length of time equal to one-fourth the period of the motion of said element.

7. Means for neutralizing vibrations in a body comprising, a weighted member resiliently mounted with respect to said body, a magnetic element having a magnetic field formed thereabout, an electrical element comprising a coil so located with respect to said magnetic element that its turns cut said field, one of said elements being mounted to move with said weighted member and the other being fixed with respect to said body, a circuit containing said coil and a source of power, a pair of contacts forming a part of said circuit, one of said contacts being so mounted on said body as not to partake of the vibration which it is desired to neutralize, the other of said contacts being so mounted as to vibrate in the same manner as said body, said contacts being so located that contact will be maintained throughout substantially the duration of each movement of said body in one direction and will be broken throughout each movement in the opposite direction, and means in said circuit to cause the passage of a pulse of current through said coil substantially one-fourth of a period of the vibration after each contact is made.

8. Means for neutralizing vibrations in a body, comprising, a weighted member resiliently mounted with respect to said body, a magnetic element having a magnetic field formed thereabout, an electrical element comprising a coil so located with respect to said magnetic element that its turns cut said field, one of said elements being mounted to move with said weighted member and the other being fixed with respect to said body, an electrical circuit containing said coil and a source of power, a contact mounted on said member and having a normally fixed location with respect thereto but so mounted as to be slidable in a direction parallel to that of the motion of said member upon the application of an external force, a bifurcated arm fixed to said body and so located with respect to said contact that its prongs lie on opposite sides of said contact and prevent all but a slight amount of movement thereof, a second contact carried by one of said prongs, said contacts forming a switch for opening and closing said circuit, whereby said circuit will be closed at the beginning of every other stroke of the vibratory motion of said member, and means in said circuit for preventing flow of current through said coil for a predetermined time after said circuit is closed.

9. Means for neutralizing in a structure vibrations generated by the rotation of a body in the vicinity thereof, comprising a weighted member resiliently mounted with respect to said structure, a magnetic element having a magnetic field formed thereabout, an electrical element comprising a coil so located with respect to said magnetic element that its turns cut said field, one of said elements being mounted to move with said weighted member and the other being fixed with respect to said structure, an electrical circuit containing said coil and a source of power, and contact carrying means driven by said rotating body at such a speed as to close said circuit at the midpoint of each stroke of said vibrations.

10. A vibration neutralizing means as claimed in claim 9, said contact carrying means comprising a rotatable head driven by said rotating body, a bar of conducting material carried by and rotating with said head, a contact point forming a part of said circuit and being in contact with the center of said bar, and a second contact point spaced from the center of said bar and so positioned as to make contact with said bar twice during each rotation thereof.

11. Means for neutralizing in a structure vibrations generated by the rotation of a body in the vicinity thereof, comprising, a weighted member resiliently mounted with respect to said body, a piston attached to said member, and means for applying to one face of said piston a series of fluid impulses, said means comprising a fluid supply line and a valve means governing fluid flow in said line, said valve means being driven by said rotating body in such timed relation that each of said fluid impulses will be applied to said piston at the middle of its stroke.

RAYMOND T. McGOLDRICK.